July 5, 1960 R. W. KETCHLEDGE 2,944,114

COMMUNICATION SWITCHING SYSTEM EMPLOYING GAS TUBES

Filed April 28, 1955 2 Sheets-Sheet 1

INVENTOR
R. W. KETCHLEDGE
BY
[signature]
ATTORNEY

July 5, 1960 R. W. KETCHLEDGE 2,944,114

COMMUNICATION SWITCHING SYSTEM EMPLOYING GAS TUBES

Filed April 28, 1955 2 Sheets-Sheet 2

INVENTOR
R. W. KETCHLEDGE
BY
ATTORNEY

United States Patent Office 2,944,114

Patented July 5, 1960

2,944,114

COMMUNICATION SWITCHING SYSTEM EMPLOYING GAS TUBES

Raymond W. Ketchledge, Whippany, N.J., assignor to Bell Telephone Laboratories, Incorporated, New York, N.Y., a corporation of New York Filed Apr. 28, 1955, Ser. No. 504,433

14 Claims. (Cl. 179—18)

This invention relates to communication switching networks and more particularly to circuits for applying appropriate voltages to the terminals of such networks for connecting and disconnecting paths through the network.

It is known that in order to establish paths through a communication switching network such as of the type utilizing gaseous discharge devices as crosspoint elements, as disclosed in Patent No. 2,684,405, issued July 20, 1954, of E. Bruce and H. M. Straube, three requirements must be met, namely, (1) a high potential must be initially applied to the terminals of the network at a low current (2) a reduced potential be applied to the terminals in response to the establishment of a path through the network to prevent the interconnection of a busy path with another busy path or a path in the process of being established, and (3) this reduced potential must be removed from the terminals of the network to disconnect the communications path. Previously, extensive circuits have been employed requiring complex switching and a large number of components to apply these required potentials to the terminals of the switching network.

A general object of this invention is to provide improved circuits for selectively establishing and disconnecting paths through a switching network.

Another object of this invention is to provide improved circuits for applying connect and disconnect potentials for establishing and disconnecting paths through a switching network.

Another object of this invention is to improve the margins of connect or marking potentials and the disconnect potentials applied to the terminals of a crosspoint switching network.

A further object of this invention is to enable the connect and disconnect signals to be applied to the terminals of a switching network by employing the same elements to perform both functions. Thus, it is an object of this invention to reduce the number of circuit elements requisite for marking input and output terminals of a switching network.

Briefly, in accordance with this invention, an improved switching arrangement is provided which employs gas triodes to apply the mark, sustain and disconnect potentials to the terminals of a crosspoint switching network. At one terminal of the network, the anodes of the triodes are connected to the terminals of the network and, at the opposite terminal of the network, the cathodes of the triodes are connected to the terminals.

When it is desired to apply a marking potential to the network, an initiating potential is selectively applied to the starter electrodes of the triodes. This potential is such that a discharge is initiated between the starter and that electrode of the triode connected to the terminal of the network. For example, a positive potential is applied to that triode having its cathode connected to the terminal of the network thereby initiating a discharge between the cathode and the starter, the starter acting as an anode. At the opposite terminal of the network a negative potential is applied to the starter electrode thereby initiating a discharge between the starter and the anode which is connected to a terminal of the network. In this instance, the starter acts as a cathode. Due to the presence of a sustain bias continuously applied across the main gap electrodes of these triodes, these discharges are transferred to the main gap. A path is now established between a source of potential connected in series with the main gap electrodes and the terminals of the network. This potential constitutes a connect or marking potential for the network to ionize those tubes not terminated in a node previously in use.

In response to the establishment of a path through the network, the triodes at opposite terminals of the network are connected in series causing increased current to flow. This high current flowing through the main gap series resistor of each of the triodes causes the potential applied to the terminals to be reduced. This decrease in potential occurs when the first path across the network is completed and prevents setting up additional paths. This condition persists during the communications period and the glow of the discharge in these triodes may conveniently be employed as busy lamps.

When it is desired to apply a disconnect potential to the terminals of the crosspoint switching network, a potential of opposite polarity to that originally applied is now applied to the starter electrodes. In each instance, the existing discharge is transferred from the main gap to one between the starter and that electrode connected to the source of potential thereby interrupting the application of a sustain potential to the terminals of the network. This causes the crosspoint tubes to deionize and produces a release of the path through the network restoring it to a condition such that another path may be established through these priorly used circuits.

It is to be understood, however, that the use of one path through the network does not prevent the establishment of other independent paths through the network. Ample paths are provided to permit a maximum number of communication paths sufficiently to meet busy-hour requirements.

Removal of these potentials from the starter electrodes together with a relaxation oscillation caused by a condenser in the starter electrode circuit increases the current flow through the series resistor connected between one of the main gap electrodes and the source of potential. This momentary current is sufficient to decrease the potential applied across the main gap below the sustain value thereby causing deionization of the triodes.

The application of marking potentials to the nodes or intermediate points of the crosspoint switching network may be controlled by means of circuits of the type disclosed in Patent No. 2,684,405 to E. Bruce and H. M. Straube or conveniently of the type disclosed in my application Serial No. 496,749, filed March 25, 1955, now Patent 2,779,822, issued January 29, 1957. The opening and closing of any of the switches that apply the marking potentials to the nodes may be accomplished manually or by means of other electron tubes performing the functions of switches.

It is a feature of this invention that mark and disconnect potentials be applied to the terminals of a switching network through individual gaseous discharge devices having anode and cathode electrodes defining a main gap, and a starter electrode, signals of one polarity being applied to the starter electrode to establish a path to that terminal and signals of the opposite polarity being applied to the starter electrode to disconnect the path to that terminal.

Further, it is a feature of this invention that the network terminals be connected to one main gap electrode and a source of direct current potential to the other main gap electrode, the signals applied to the starter electrode being such that a discharge is estabished between the starter electrode and the one main gap electrode which discharge is transferred to the other main gap electrode to establish the path between the direct current source and the network terminal. This discharge is transferred to the starter electrode from the one main gap electrode to disconnect the path between the direct current source and the terminal.

It is still a further feature of this invention that the terminals at one side of the switching network be connected to one main gap electrode and the terminals at the other side of the switching network to the other main gap electrode of their respective discharge devices, the marking and disconnect pulses applied to the starter electrodes being of opposite polarities for the terminals on the two sides of the switching network.

In accordance with another feature of this invention, a condenser is connected to the starter electrode of the marking gaseous triode to aid in initiating and extinguishing the discharge between the starter electrode and the main gap electrode not connected to the network terminal on application of the disconnect signal to the starter electrode.

A further feature of this invention involves the use of a resistor in series with the main gap defining electrodes of a gas discharge device to perform a dual function, namely, that of providing lockout between established paths of communication and aiding in the extinction of the associated gas discharge device. This resistor also serves to regulate the current flow in the path.

The foregoing and other objects and features of this invention may readily be understood from the following description when read with reference to the accompanying drawings in which.

Figure 1:
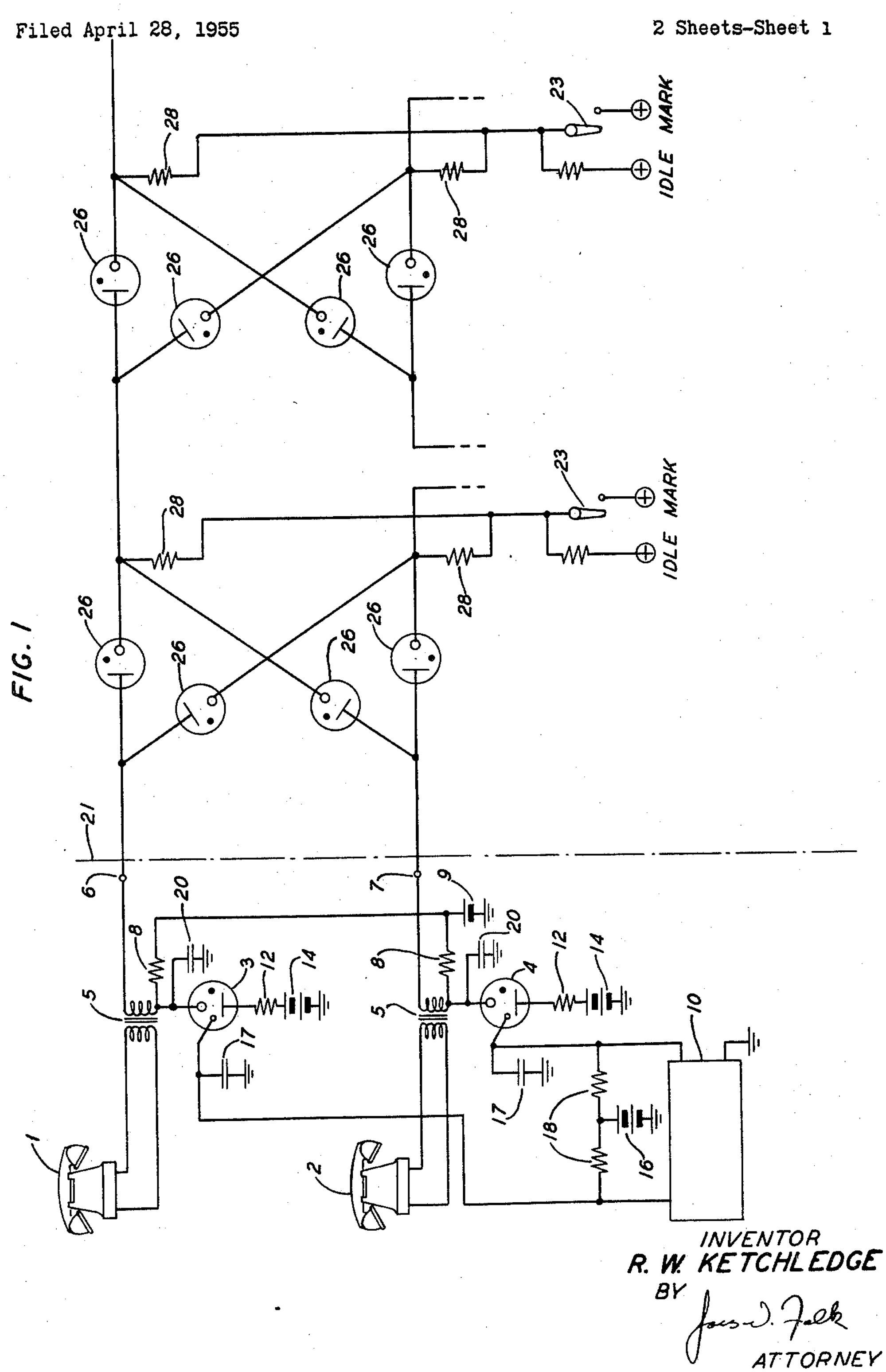
Figs. 1 and 2 depict in schematic form, a portion of a switching network illustrative of one specific embodiment of the invention.
Figures 2, 3:
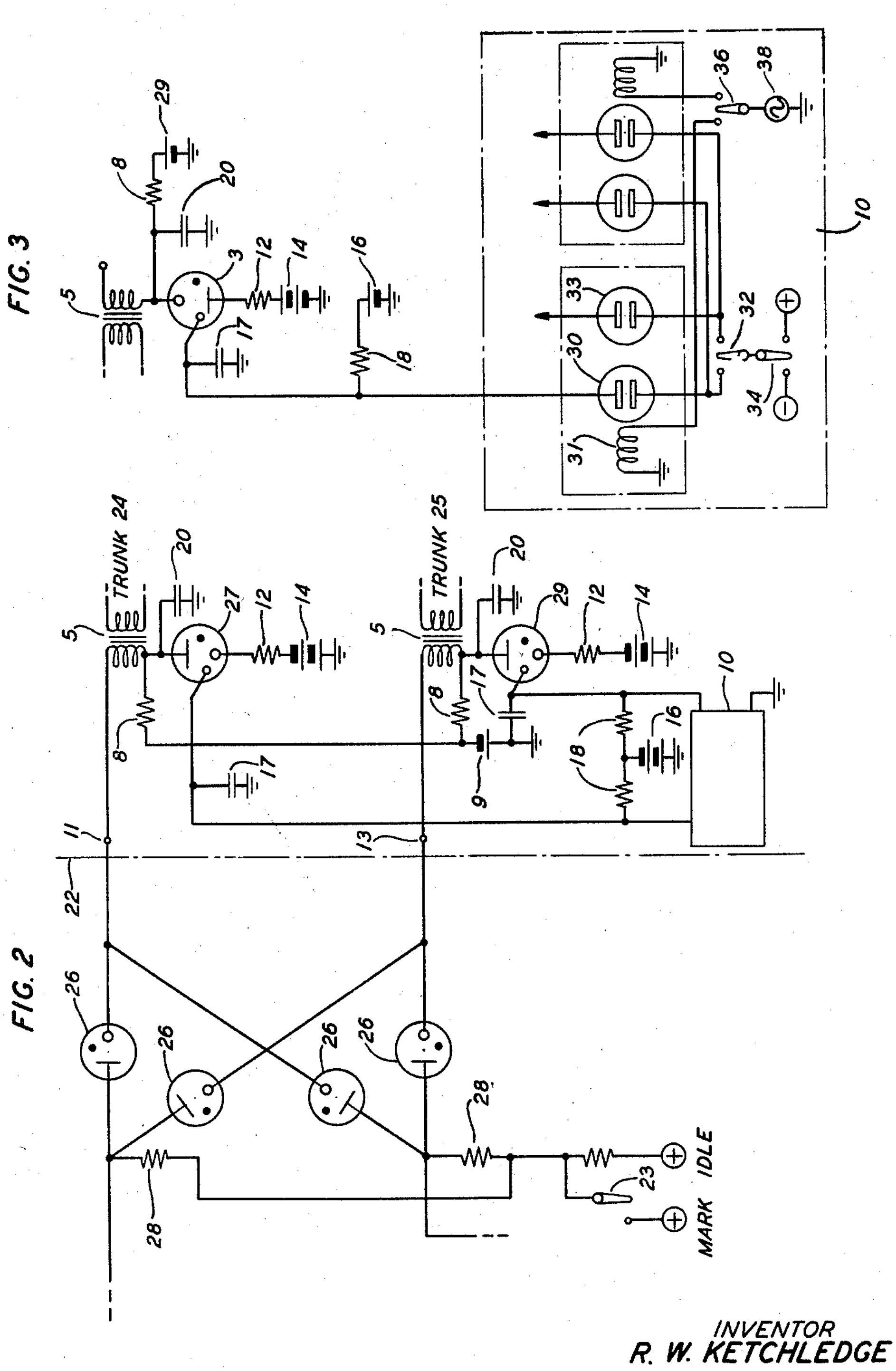
Fig. 3 depicts a selection circuit which may be employed in the embodiment of Figs. 1 and 2.

Figs. 1 and 2, when positioned adjacent each other, are a schematic representation of one specific embodiment of terminal marking circuit, in accordance with this invention, and switching network. While only two subscriber lines and two trunks are depicted, it is to be understood that a large number of lines and trunks may be connected to individual terminals of the switching network; a subscriber's line circuit or trunk circuit and related equipment together with a terminal marking circuit in accordance with this invention are provided for each of the subscribers, each party line, or trunk.

Circuitry for recognizing the condition of the subscriber's line and trunk in order to perform the switching in response thereto are not depicted; such circuitry may be of any expedient type known in the art. Specifically such circuitry may be of the type disclosed in Bruce-Straube Patent No. 2,684,405, issued July 20, 1954.

Referring now to Figs. 1 and 2 of the drawings, there are shown a pair of subscriber telephones 1 and 2 coupled respectively through a pair of transformers 5 to terminals 6 and 7 of a crosspoint switching network. The switching network may comprise a plurality of crosspoint devices, such as gaseous discharge devices 26, connected together to define a plurality of possible paths through the switching network. Marking voltages are applied to the interior nodes of the switching network by switches 23, which may be operated manually or automatically, through lockout resistances 28, as is known. The switching network itself, which is indicated on the drawing between the broken lines 21 and 22 on Figs. 1 and 2, respectively, may be of the type described in the above-mentioned Bruce-Straube patent. Gas triodes 3 and 4 are connected to the secondary of transformers 5 for the purpose of applying mark, sustain and disconnect potentials to these terminals. These triodes may conveniently be of any type wherein the starter electrode may sustain a discharge to either the cathode or anode, such as that known as the Western Electric 313 type. Circuit 10, indicated by block diagram in Figs. 1 and 2, constitutes the source of positive and negative control potentials for the starter electrodes of the several triodes and may be of any of many types known in the art. Advantageously, as depicted in Fig. 3, it may be of the type disclosed in my copending application Serial No. 389,751, filed November 2, 1953.

Isolating resistors 8 are connected between each of the secondaries of transformers 5 and a source of bias potential 9. This bias normally maintains the crosspoint terminal at a deionized potential. Resistors 12 are connected in series with each of the several triode main gap electrodes and the source of terminal marking potential 14. Ionization of these triodes will therefore complete the path between the sources of potentials 14 and the selected terminals of the network. Resistors 12 also aid in the extinction of associated triodes in a manner as will be subsequently explained. Source 16 constitutes a bias for the starter electrodes and is connected to these starters through indivdiual resistors 18; source 16 and resistors 18 also provide a direct current return path for control signals applied to the starter electrodes. Condensers 17 are connected between each of the several starter electrodes of the triodes and ground to cooperate with resistors 12 to aid in the extinction and deionization of these triodes. Condensers 20 are connected between each of the transformer 5 secondaries to complete the communications path by way of a ground return.

There is similarly connected to each of the trunks, of which only two, trunks 24 and 25 are depicted in Fig. 2, an identical trunk terminal marking circuit, including the gaseous discharge devices 27 and 29, except that the connections of the main gap electrodes of the line marking devices 3 and 4 are the opposite of those for the trunk marking devices 27 and 29. Thus whereas the cathode of the devices 3 and 4 is connected to the terminal and the anode to the source of direct current potential, the anodes of the devices 27 and 29 are connected to the switching network terminals 11 and 13, respectively, and the cathodes to the sources 14 of direct current potential. Accordingly, as discussed further below, the potentials applied to the respective starter electrodes of the devices 3, 4 and 27, 29 for establishing and disestablishing the connection through the switching network are opposite to each other. The other elements of the trunk terminal marking circuits in accordance with this invention are basically the same as those for the line terminal marking circuits described above and are identified in Fig. 2 by the same reference numerals, the source 14 for the trunk terminals 11 and 13 being of course of the opposite sign to the source 14 for the line terminals 6 and 7.

Assume for the purposes of illustration that the subscriber at telephone station 1 wishes to place a call over trunk 25. Positive and negative potentials are applied from the circuits 10 to the starter electrodes of gas triodes 3 and 29, respectively. These potentials may be applied in any convenient manner and may advantageously be applied in a manner explained in connection with Fig. 3. This initiates a discharge in triode 3 between the starter electrode and the anode and in triode 29 between the starter electrode and the cathode. This discharge is now transferred to the main gap defining electrodes of each of the triodes from the starter electrode due to the presence of a sustain potential applied across the tube from sources 9 and 14 through resistors 8 and 12. This discharge effectively closes the circuit between sources 14 and terminals 6 and 13, respectively, of the crosspoint network.

Switches 23 are moved to their mark position or the circuit otherwise closed by analogous electrical or electronic means thereby applying breakdown potential to all the tubes extending to idle junctions or nodes in the intermediate stages of the crosspoint network. These stages are not limited to the three shown but may be of any desirable number. In the terminal stages of the network, only those tubes are ionized which are connected to terminals 6 and 13. Under these conditions, parallel circuits are set up between terminals 6 and 13, as is known in the art. However, when the first of these parallel circuits is completed, resistors 12 in the anode and cathode circuit of triodes 3 and 29, respectively, limit the value of the circuit current to that sufficient to sustain only one of the parallel paths. Advantageously, that path is selected which has the shortest ionization time or which has the lowest impedance and the other paths are either not formed or are extinguished. Also, these resistors decrease the potential available throughout the established path which decrease causes lockout between this path and any other path which might be established. A communications path is now established through the crosspoint network, the other side of which consists of condensers 20 which constitute a portion of the ground return path for the communication currents.

After the call has been completed, it is necessary to deionize the path through the crosspoint network. This may be accomplished by disconnecting the potentials applied to either or both terminals of the network. As previously stated, gas triodes 3 and 29 remain ionized while the path is maintained through the network. In order to remove the sustain potentials from terminals 6 and 13, it is necessary that the discharge in these triodes be removed from the anode-cathode path. This is advantageously accomplished by the application of negative and positive potentials to the starter electrodes of triodes 3 and 29, respectively. The main gap discharge of tube 3 will now be transferred from the cathode of triode 3 to the starter electrode, the starter electrodes acting as a cathode. Similarly, the main gap discharge of tube 29 will be transferred from the anode to the starter electrode which is now acting as an anode. These discharges now continue momentarily between the starter electrodes and the electrodes of triodes 3 and 29 connected to sources 14. Thus, in each instance the circuit has been interrupted between the battery 14 and the terminals 6 and 13 thereby removing the sustain potential and causing the crosspoints connected to those terminals to be deionized.

The next step involves deionization of triodes 3 and 29 since discharge persists between the starter electrode and the anode and cathode, respectively, of these tubes and a sustain potential is continuously applied between the main gap electrodes. This is accomplished by the removal of the potentials from the starter electrodes and a relaxation oscillation caused between condenser 17 in the starter electrode circuit and the anode or cathode of the device. This relaxation oscillation causes a high current momentarily to flow between the starter electrode and the main gap electrode connected to marking battery 14. This high current flowing into condenser 17 causes the starter gap potential to be reduced below the sustain value thereby extinguishing the discharge in the triode while at the same time maintaining the main gap potential below its sustain value by current flow through resistor 12.

Switches 23 are restored to their idle position thereby removing the marking potentials from the intermediate stages of the crosspoint network. There is no requirement, however, that these marking potentials need be applied through switches 23 after the communications path is established. The application of marking potentials to terminals 6 and 7 from battery 14 together with the direct current flow through the talking path is sufficient to maintain the crosspoint path in an ionized condition.

Referring now to Fig. 3, an exemplary circuit is shown which may be used to apply the previously mentioned positive and negative potentials to the starter electrodes of the triodes. My application Serial No. 389,751, filed November 2, 1953, now abandoned, discloses the utilization of an alternating current electromagnetic field to ionize a gas tube and thereby complete the circuit through the gas tube. This principle is employed to render tubes 30 and 33 ionized. When switch 36 is moved to its left-hand position, alternating current from source 38 is applied to coil 31 setting up a magnetic field about gas tubes 30 and 33. Switches 32 and 34 are moved to their left-hand and right-hand positions, respectively. This applies a positive potential to one side of tube 30 and, after tube 30 has been rendered conductive by the magnetic field, this positive potential is applied to the starter electrode connected to tube 30. While tube 33 is also ionized, no potential is applied through that tube to its associated starter electrode as the circuit between tube 33 and the source of potential is open at switch 32.

To apply a negative pulse to the starter electrode, switches 32, 34 and 36 are moved to their left-hand positions. To deionize tube 3, switch 36 is restored to its normal position, interrupting the flow of alternating current to coil 31 and the electromagnetic field collapses deionizing tubes 30 and 33. This deionization of tube 30 opens the path between the source of potential and the starter electrode and the previously mentioned relaxation oscillation takes place.

While this method of applying potentials to the starter electrodes is shown, it is understood that any other switching arrangement may be employed which would selectively apply positive and negative potentials to the starter electrodes.

It is to be understood that the above-described arrangements are illustrative of the application of the principles of the invention. Numerous other arrangements may be devised by those skilled in the art without departing from the spirit and scope of the invention.

What is claimed is:

1. A communication switching network comprising a first and a second group of terminals and means for applying predetermined voltages to selected ones of said terminals to establish and disestablish a path through the network, said means including a gas discharge device having a pair of main gap defining electrodes and a starter electrode, means connecting one of said main gap electrodes to one of said terminals and the other of said main gap electrodes to a source of potential, means for applying a potential of one polarity to said starter electrode initiating a discharge between said starter electrode and said one main gap electrode, and means for applying a potential of the opposite polarity to said starter electrode initiating a discharge between said starter and said other main gap electrode thereby applying a disconnect potential to said one terminal.

2. A communication switching network in accordance with claim 1 further including a reactance in circuit with said starter electrode to aid in the initiation of discharge between said starter and said one main gap electrode and aid in the extinction of the discharge in said gas discharge device.

3. A communication switching network in accordance with claim 2 further including impedance means in circuit with said other main gap electrode limiting the value of sustain potential and cooperating with said reactance to extinguish said gas discharge device.

4. A communication switching network including a first and a second group of terminals, means interconnecting said groups of terminals and establishing the communication paths therethrough in response to the application of selected potentials to said terminals, and means for applying selected potentials to said groups of terminals, said last mentioned means including a plurality of gas discharge devices having a pair of main gap defining electrodes and a starter electrode, one of said main gap defining electrodes being connected to each of said terminals and the other of said main gap defining electrodes being connected to a source of potential, means for applying a signal of one polarity to selected ones of said starter electrodes to establish a discharge between said starter and said one main gap electrode, and means for applying a signal of the opposite polarity to said starter electrode to interrupt the discharge between said main gap defining electrodes.

5. A communication switching network including a first and a second group of terminals and means for selectively establishing paths between said first and said second group terminals, said last-mentioned means including a plurality of gas discharge devices each having a pair of main gap defining electrodes and a starter electrode, one of said main gap defining electrodes being connected to each of said terminals and the other of said main gap electrodes being connected to a source of potential, and means for selectively applying a potential to said starter electrodes to initiate a discharge between said starter electrodes and said one main gap electrode, and for selectively applying another potential to said starter electrode to transfer the discharge to the starter electrode and the other of said main gap electrodes whereby potentials are connected to and disconnected from said terminals.

6. A communication switching network including a first and a second group of terminals, a plurality of possible paths interconnecting said terminals, and means for applying connect and disconnect potentials to said paths, said means including a first and a second group of gas discharge devices each having a pair of main gap defining electrodes and a starter electrode, said first group gas discharge devices having one of said main gap defining electrodes connected to each of said first group terminals, the second group of said gas discharge devices having the other main gap defining electrode connected to said second group terminals, means for applying connect and disconnect signals of positive and negative potentials respectively to the starter electrodes of one of said groups, and means for applying connect and disconnect signals of negative and positive potentials respectively to the starter electrodes of the other group of gas discharge devices.

7. A communication switching network according to claim 6 wherein said main gap defining electrodes are anodes and cathodes, the anodes of said first group gas discharge devices being connected to said first group terminals and the cathodes of said first group gas discharge devices being connected to a source of negative potential, said second group gas discharge devices having their cathodes connected to said second group terminals, and their anodes connected to a source of positive potential.

8. A communication switching network in accordance with claim 7 further including a capacitance element in circuit with each of said starter electrodes to aid in the ignition and extinction of the discharge.

9. A communication switching network in accordance with claim 8 further including impedance means in the main gap discharge circuit of each of said gas discharge devices to limit the value of current applied to said terminals and cooperate with said capacitance elements to aid in the extinction of the associated gas discharge device.

10. A communication switching network comprising a plurality of lines, means defining a plurality of paths between selected ones of said lines, and means for establishing and disconnecting said paths, said means including an electron discharge device having an anode, a cathode, and a starter electrode and connected to each of said lines, said starter electrode being adapted to define a discharge gap both with said anode and said cathode, potential means connected in series between each of said electron discharge devices and ground, and means for applying signals of one polarity to said starter electrode to establish said path and for applying signals of the opposite polarity to said starter electrode to disconnect said path.

11. A communication switching network comprising a first plurality of lines, a second plurality of lines, means defining a plurality of paths between said first and second plurality of lines, a gaseous discharge device connected to each of said first and second plurality of lines, said gaseous discharge devices comprising an anode, a cathode, and a starter electrode, means connecting each of said first plurality of lines to the cathodes of certain of said discharge devices and means connecting each of said second plurality of lines to the anodes of certain of said discharge devices, means applying a direct current voltage source to the anodes of said discharge devices coupled to said first plurality of lines and to the cathodes of said discharge devices coupled to said second plurality of lines, means for applying negative pulses to the starter electrodes of said discharge devices coupled to said first plurality of lines and positive pulses to the starter electrodes coupled to said second plurality of lines to establish a path between selected ones of said first and second lines, and means for applying positive pulses to said starter electrodes of said discharge devices coupled to said first plurality of lines and negative pulses to said starter electrodes of said discharge devices coupled to said second plurality of lines to disconnect said paths between said first and second lines.

12. A communication switching system comprising a plurality of lines, means for establishing paths between selected ones of said lines on the application of marking potentials to said lines, said paths being disconnected on the application of disconnect potentials to said lines, and means for applying said marking and said disconnect potentials to said lines, said last-mentioned means comprising a gaseous discharge device connected to each of said lines, said discharge devices having an anode and a cathode defining a main discharge gap and a starter electrode, means connecting one of said main gap electrodes to said line, means applying a direct current voltage bias to the other of said main gap electrodes, and means for applying pulses of one polarity to said starter electrode for marking said line and of the opposite polarity to said starter electrode for disconnecting the path established to said line.

13. A communication switching system in accordance with claim 12 wherein said last-mentioned means comprises means for applying a pulse of a polarity to establish a discharge between said starter electrode and said one main gap electrode for marking said line and for applying a pulse to said starter electrode of a polarity to establish a discharge between said starter electrode and said other gap electrode for disconnecting said path to said line.

14. In a communication system, a plurality of input lines, a plurality of output lines, a switching network between said input and output lines for connecting individual ones of said input lines to individual ones of said output lines, said network comprising a plurality of gaseous discharge devices, and means for applying potentials to said input and output lines to effect a connection through said switching network between particular ones of said input and output lines, said last-mentioned means including a first and a second group of gas tubes having anode and cathode electrodes defining a main gap and starter electrodes, the anodes of said first group of gas tubes being connected to said output lines and the cathodes of said second group of gas tubes being connected to said input lines, means applying potentials to said first group cathodes and said second group anodes, means for applying a potential to said second group starter electrodes to effect a discharge between said second group starter electrodes and cathodes, means for applying a potential to said first group starter electrodes to effect a discharge between said first group starters and anodes, which discharges are transferred to said main gap electrodes, and means for applying a potential to said starter electrodes to effect a discharge between said first group starter electrodes and said first group cathodes and said second group starter electrodes and said second group anodes to interrupt the discharge between said main gap electrodes and thereby disconnect said connection through said switching network.

References Cited in the file of this patent

UNITED STATES PATENTS

| | | |
|---|---|---|
| 2,291,752 | Parker | Aug. 4, 1942 |
| 2,676,210 | Oberman et al. | Apr. 20, 1954 |
| 2,722,567 | Davison et al. | Nov. 1, 1955 |
| 2,769,865 | Faulkner | Nov. 6, 1956 |
| 2,780,674 | Six et al. | Feb. 5, 1957 |
| 2,787,666 | Flood | Apr. 2, 1957 |